(12) United States Patent
Scheinert et al.

(10) Patent No.: US 8,005,050 B2
(45) Date of Patent: Aug. 23, 2011

(54) LOCALIZATION OF A MOBILE DEVICE IN DISTRIBUTED ANTENNA COMMUNICATIONS SYSTEM

(75) Inventors: Stefan Scheinert, San Jose, CA (US); Peter Walther, Milpitas, CA (US)

(73) Assignee: LGC Wireless, Inc., San Jose, CA (US)

( * ) Notice: Subject to any disclaimer, the term of this patent is extended or adjusted under 35 U.S.C. 154(b) by 953 days.

(21) Appl. No.: 11/728,123

(22) Filed: Mar. 23, 2007

(65) Prior Publication Data

US 2008/0232328 A1    Sep. 25, 2008

(51) Int. Cl.
*H04B 7/216*    (2006.01)

(52) U.S. Cl. .................. 370/335; 455/456.2; 455/562.1; 455/101; 370/328; 370/320

(58) Field of Classification Search .................. 370/335, 370/334, 339, 320
See application file for complete search history.

(56) References Cited

U.S. PATENT DOCUMENTS

| | | | |
|---|---|---|---|
| 3,586,968 A | 6/1971 | Barjot | |
| 3,733,430 A | 5/1973 | Thompson et al. | |
| 3,866,121 A | 2/1975 | Nakamura et al. | |
| 4,183,054 A | 1/1980 | Patisaul et al. | |
| 4,433,335 A | 2/1984 | Wind | |
| 4,451,916 A | 5/1984 | Casper et al. | |
| 4,611,323 A | 9/1986 | Hessenmüller | |
| 4,628,501 A | 12/1986 | Loscoe | |
| 4,642,426 A | 2/1987 | Blackburn | |
| 4,654,843 A | 3/1987 | Roza et al. | |
| 4,667,319 A | 5/1987 | Chum | |
| 4,691,292 A | 9/1987 | Rothweiler | |
| 4,733,223 A | 3/1988 | Gilbert | |
| 4,760,573 A | 7/1988 | Calvignac et al. | |
| 4,789,993 A | 12/1988 | Ryu | |
| 4,799,062 A | 1/1989 | Sanderford, Jr. et al. | |
| 4,999,831 A | 3/1991 | Grace | |
| 5,193,109 A | 3/1993 | Chien-Yeh Lee | |

(Continued)

FOREIGN PATENT DOCUMENTS

DE    3707244 A    9/1988

(Continued)

OTHER PUBLICATIONS

B. Schweber, Maintaining cellular connectivity indoors demands sophisticated design, EDN Magazine, Dec. 21, 2000.

(Continued)

*Primary Examiner* — Kamran Afshar
*Assistant Examiner* — Khalid Shaheed
(74) *Attorney, Agent, or Firm* — Fogg & Powers LLC (57) ABSTRACT

The present invention provides a method and apparatus for localization of a mobile device in a distributed antenna communications system. In accordance with an embodiment of the invention, a distributed antenna system includes a plurality of distributed antennas that are communicatively coupled to a hub. A mobile communications device to be located is communicatively coupled to the hub via one or more of the antennas. The method for locating the mobile device comprises: receiving a message at the hub that identifies the mobile device to be located; discriminating among communications signals received from each of the distributed antennas using a channel and a spreading code to identify a signal from the mobile device; identifying messages from the mobile device to be located; and determining which of the antennas is closest to the mobile device to be located by monitoring received signal strength of the identified signal.

34 Claims, 7 Drawing Sheets

U.S. PATENT DOCUMENTS

| | | |
|---|---|---|
| 5,212,831 A | 5/1993 | Chuang et al. |
| 5,227,679 A | 7/1993 | Woo |
| 5,243,598 A | 9/1993 | Lee |
| 5,263,177 A | 11/1993 | Schieve et al. |
| 5,303,287 A | 4/1994 | Laborde |
| 5,317,323 A | 5/1994 | Kennedy et al. |
| 5,321,736 A | 6/1994 | Beasley |
| 5,321,849 A | 6/1994 | Lemson |
| 5,327,144 A | 7/1994 | Stilp et al. |
| 5,339,184 A | 8/1994 | Tang |
| 5,351,146 A | 9/1994 | Chan et al. |
| 5,381,459 A | 1/1995 | Lappington |
| 5,400,391 A | 3/1995 | Emura et al. |
| 5,461,627 A | 10/1995 | Rypinski |
| 5,508,708 A | 4/1996 | Ghosh et al. |
| 5,512,908 A | 4/1996 | Herrick |
| 5,519,691 A | 5/1996 | Darcie et al. |
| 5,545,397 A | 8/1996 | Spielvogel et al. |
| 5,563,606 A | 10/1996 | Wang |
| 5,566,168 A | 10/1996 | Dent |
| 5,602,903 A | 2/1997 | LeBlanc et al. |
| 5,603,080 A | 2/1997 | Kallander et al. |
| 5,621,414 A | 4/1997 | Nakagawa |
| 5,621,786 A | 4/1997 | Fischer et al. |
| 5,627,879 A | 5/1997 | Russell et al. |
| 5,631,916 A | 5/1997 | Georges et al. |
| 5,642,405 A | 6/1997 | Fischer et al. |
| 5,644,622 A | 7/1997 | Russell et al. |
| 5,657,374 A | 8/1997 | Russell et al. |
| 5,668,562 A | 9/1997 | Cutrer et al. |
| 5,682,256 A | 10/1997 | Motley et al. |
| 5,701,583 A | 12/1997 | Harbin et al. |
| 5,708,961 A | 1/1998 | Hylton et al. |
| 5,732,076 A | 3/1998 | Ketseoglou et al. |
| 5,761,619 A | 6/1998 | Danne et al. |
| 5,765,097 A | 6/1998 | Dail |
| 5,765,099 A | 6/1998 | Georges et al. |
| 5,774,789 A | 6/1998 | Van der Kaay et al. |
| 5,781,541 A | 7/1998 | Schneider |
| 5,781,859 A | 7/1998 | Beasley |
| 5,784,028 A | 7/1998 | Corman et al. |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,809,419 A | 9/1998 | Schellinger et al. |
| 5,809,422 A | 9/1998 | Raleigh et al. |
| 5,815,538 A | 9/1998 | Grell et al. |
| 5,822,324 A | 10/1998 | Kostresti et al. |
| 5,833,493 A | 11/1998 | Hung |
| 5,852,651 A | 12/1998 | Fischer et al. |
| 5,875,179 A | 2/1999 | Tikalsky |
| 5,878,325 A | 3/1999 | Dail |
| 5,883,882 A | 3/1999 | Schwartz |
| 5,887,261 A | 3/1999 | Csapo et al. |
| 5,907,544 A | 5/1999 | Rypinski |
| 5,912,641 A | 6/1999 | Dietrich |
| 5,930,682 A | 7/1999 | Schwartz et al. |
| 5,945,948 A | 8/1999 | Buford et al. |
| 5,946,622 A | 8/1999 | Bojeryd |
| 5,969,679 A | 10/1999 | Bolliger et al. |
| 5,969,837 A | 10/1999 | Farber et al. |
| 5,970,414 A | 10/1999 | Bi et al. |
| 5,983,070 A | 11/1999 | Georges et al. |
| 5,987,014 A | 11/1999 | Magill et al. |
| 5,987,326 A | 11/1999 | Tiedemann, Jr. et al. |
| 6,005,884 A | 12/1999 | Cook et al. |
| 6,014,546 A | 1/2000 | Georges et al. |
| 6,034,950 A | 3/2000 | Sauer et al. |
| 6,078,812 A | 6/2000 | Mintz |
| 6,084,547 A | 7/2000 | Sanderford et al. |
| 6,108,113 A | 8/2000 | Fee |
| 6,108,550 A | 8/2000 | Wiorek et al. |
| 6,108,626 A | 8/2000 | Cellario et al. |
| 6,111,541 A | 8/2000 | Karmel |
| 6,112,086 A | 8/2000 | Wala |
| 6,125,260 A | 9/2000 | Wiedeman et al. |
| 6,127,975 A | 10/2000 | Maloney |
| 6,128,496 A | 10/2000 | Scheinert |
| 6,147,786 A | 11/2000 | Pan |
| 6,157,659 A | 12/2000 | Bird |
| 6,157,810 A | 12/2000 | Georges et al. |
| 6,175,308 B1 | 1/2001 | Tallman et al. |
| 6,181,253 B1 | 1/2001 | Eschenbach et al. |
| 6,181,687 B1 | 1/2001 | Bisdikian |
| 6,188,693 B1 | 2/2001 | Murakami |
| 6,192,216 B1 | 2/2001 | Sabat, Jr. et al. |
| 6,195,342 B1 | 2/2001 | Rohani |
| 6,198,558 B1 | 3/2001 | Graves et al. |
| 6,201,803 B1 | 3/2001 | Munday et al. |
| 6,204,813 B1 | 3/2001 | Wadell et al. |
| 6,222,660 B1 | 4/2001 | Traa |
| 6,226,274 B1 | 5/2001 | Reese et al. |
| 6,236,365 B1 | 5/2001 | LeBlanc |
| 6,249,252 B1 | 6/2001 | Dupray |
| 6,262,981 B1 | 7/2001 | Schmutz |
| 6,275,990 B1 | 8/2001 | Dapper et al. |
| 6,285,881 B1 | 9/2001 | Huang |
| 6,317,884 B1 | 11/2001 | Eames et al. |
| 6,337,754 B1 | 1/2002 | Imajo |
| 6,353,600 B1 | 3/2002 | Schwartz et al. |
| 6,362,908 B1 | 3/2002 | Kimbrough et al. |
| 6,373,887 B1 | 4/2002 | Aiyagari et al. |
| 6,374,124 B1 | 4/2002 | Slabinski |
| 6,377,640 B2 | 4/2002 | Trans |
| 6,421,009 B2 | 7/2002 | Suprunov |
| RE37,820 E | 8/2002 | Scheinert |
| 6,459,900 B1 | 10/2002 | Scheinert |
| 6,466,572 B1 | 10/2002 | Ethridge et al. |
| 6,480,551 B1 | 11/2002 | Ohishi et al. |
| 6,484,012 B1 | 11/2002 | Nche et al. |
| 6,486,907 B1 | 11/2002 | Farber et al. |
| 6,498,936 B1 | 12/2002 | Raith |
| 6,501,955 B1 | 12/2002 | Durrant et al. |
| 6,556,551 B1 | 4/2003 | Schwartz |
| 6,564,057 B1 | 5/2003 | Chun et al. |
| 6,567,473 B1 | 5/2003 | Tzannes |
| 6,574,472 B1 | 6/2003 | Scheinert |
| 6,594,496 B2 | 7/2003 | Schwarz |
| 6,667,973 B1 | 12/2003 | Gorshe et al. |
| 6,674,966 B1 | 1/2004 | Koonen |
| 6,684,058 B1 | 1/2004 | Karacaoglu et al. |
| 6,697,603 B1 | 2/2004 | Lovinggood et al. |
| 6,704,545 B1 | 3/2004 | Wala |
| 6,729,929 B1 | 5/2004 | Sayers et al. |
| 6,768,745 B1 | 7/2004 | Gorshe et al. |
| 6,771,933 B1 | 8/2004 | Eng et al. |
| 6,785,558 B1 | 8/2004 | Stratford et al. |
| 6,801,767 B1 | 10/2004 | Schwartz et al. |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,907,048 B1 | 6/2005 | Treadaway et al. |
| 6,917,614 B1 | 7/2005 | Laubach et al. |
| 6,952,181 B2 | 10/2005 | Karr et al. |
| 6,963,305 B2 | 11/2005 | Knapp |
| 6,967,966 B1 | 11/2005 | Donohue |
| 7,014,500 B2 | 3/2006 | Belesimo |
| 7,016,308 B1 | 3/2006 | Gallagher |
| 7,035,671 B2 | 4/2006 | Solum |
| 7,050,786 B2 | 5/2006 | Caci |
| 7,103,279 B1 | 9/2006 | Koh et al. |
| 7,127,175 B2 | 10/2006 | Mani et al. |
| 7,136,624 B2 | 11/2006 | Ofuji et al. |
| 7,151,940 B2 | 12/2006 | Diao et al. |
| 7,162,261 B1 * | 1/2007 | Yarkosky et al. ............ 455/513 |
| 7,205,864 B2 | 4/2007 | Schultz, Jr. et al. |
| 7,215,651 B2 | 5/2007 | Millar |
| 7,286,507 B1 * | 10/2007 | Oh et al. ................. 370/334 |
| 7,289,972 B2 | 10/2007 | Rieser et al. |
| 7,313,415 B2 | 12/2007 | Wake et al. |
| 7,336,961 B1 * | 2/2008 | Ngan ................... 455/456.1 |
| 7,356,343 B2 * | 4/2008 | Feher ................... 455/456.1 |
| 2002/0037054 A1 | 3/2002 | Schurig |
| 2002/0049061 A1 | 4/2002 | Pinola |
| 2002/0089958 A1 | 7/2002 | Feder et al. |
| 2002/0097704 A1 * | 7/2002 | Bolgiano et al. ............ 370/342 |

| | | | |
|---|---|---|---|
| 2002/0128009 | A1 | 9/2002 | Boch et al. |
| 2002/0151278 | A1* | 10/2002 | McLain et al. ............... 455/67.1 |
| 2002/0191565 | A1 | 12/2002 | Mani et al. |
| 2003/0162498 | A1 | 8/2003 | Rofheart et al. |
| 2003/0216121 | A1 | 11/2003 | Yarkosky |
| 2004/0001477 | A1 | 1/2004 | D'Amico et al. |
| 2004/0033804 | A1 | 2/2004 | Binzel |
| 2004/0066326 | A1 | 4/2004 | Knapp |
| 2004/0102195 | A1 | 5/2004 | Naghian et al. |
| 2004/0204097 | A1 | 10/2004 | Scheinert et al. |
| 2004/0233877 | A1 | 11/2004 | Lee et al. |
| 2004/0248580 | A1 | 12/2004 | Backes et al. |
| 2004/0258100 | A1 | 12/2004 | Jantti et al. |
| 2005/0143091 | A1 | 6/2005 | Shapira et al. |
| 2005/0148368 | A1 | 7/2005 | Scheinert et al. |
| 2005/0153712 | A1* | 7/2005 | Osaka et al. ............... 455/456.5 |
| 2005/0157675 | A1 | 7/2005 | Feder et al. |
| 2005/0176368 | A1 | 8/2005 | Young et al. |
| 2005/0221817 | A1 | 10/2005 | Pinola |
| 2005/0227710 | A1* | 10/2005 | Yamashita et al. ......... 455/456.1 |
| 2005/0233710 | A1 | 10/2005 | Lakkis et al. |
| 2006/0025158 | A1* | 2/2006 | Leblanc et al. ............ 455/456.2 |
| 2006/0041680 | A1 | 2/2006 | Proctor, Jr. et al. |
| 2006/0072602 | A1 | 4/2006 | Achanta |
| 2006/0094470 | A1 | 5/2006 | Wake et al. |
| 2006/0123053 | A1 | 6/2006 | Scannell, Jr. |
| 2006/0133346 | A1 | 6/2006 | Chheda et al. |
| 2006/0172710 | A1 | 8/2006 | Cahana et al. |
| 2006/0234722 | A1 | 10/2006 | Hanebeck et al. |
| 2007/0099562 | A1 | 5/2007 | Karabinis et al. |
| 2008/0014948 | A1 | 1/2008 | Scheinert |
| 2009/0061766 | A1 | 3/2009 | Ding et al. |

FOREIGN PATENT DOCUMENTS

| | | |
|---|---|---|
| EP | 0391597 | 10/1990 |
| EP | 0664621 | 7/1995 |
| EP | 0876073 | 11/1998 |
| GB | 2253770 | 9/1992 |
| GB | 2289198 | 11/1995 |
| GB | 2315959 | 2/1998 |
| GB | 2320653 | 6/1998 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0174013 | 10/2001 |
| WO | 0174100 | 10/2001 |
| WO | 0217669 | 2/2002 |
| WO | 02059638 | 8/2002 |
| WO | 02087275 | 10/2002 |
| WO | WO 2004/034508 | 4/2004 |

OTHER PUBLICATIONS

International Searching Authority, "International Search Report", Apr. 3, 2008, Published in: WO.

"Edge Introduction of High-Speed Data in GSM/GPSR Networks", 2003, pp. 1-16, Publisher: Ericsson AB.

"Mulitple-Input Multiple-Output Communications", "http://en.wikipedia.org/wiki/Multiple-input_multiple-ouput_communications", May 17, 2007, Publisher: Wikipedia, Published in: US.

"Products: nanGSM Picocell", "http://www.ipaccess.com/nanGSM/nanGSM.htm", Aug. 2, 2007, pp. 1-8, Publisher: ip.access.

Hewlett-Packard Development CO., L.P., "Voice Over Wireless LAN Solution Brief", "ProCurve Networking by H.P.", 2006, Publisher: Hewlett-Packard Development Co., L.P.

Wala, "A New Microcell Architecture Using Digital Optical Transport", "Proceedings of the Vehicular Technology Conference", May 18, 1993, pp. 585-588, Publisher: IEEE, Published in: US.

Akos et al., "Direct Bandpass Sampling of Multiple Distinct RF Signals", Jul. 1, 1999, pp. 983-988, vol. 47, Publisher: IEEE Transactions on Communications.

Djuknic, G.M. and R.E. Richton, "Geolocation and Assisted GPS", "IEEE Computer", 2001, pp. 123-125, vol. 34, No. 2, Publisher: IEEE.

Foxcom Wireless Properietary Information, "Litenna In-Building RF Distribution System", 1998, pp. 1-8.

1998 Foxcom Wireless Proprietary Information, "Application Note "RFiber—RF Fiberoptic Links for Wireless Applications"", 1998, pp. 3-11, Published in: US.

Nakatsugawa et al., "Software Radio Base and Personal Stations for Cellular/PCS—Systems", 2000, pp. 617-621, Publisher: IEEE.

"Tektronix Synchronous Optical Network (SONET)", "http://www.iec.org/online/tutorials/sonet/topic03.html", 2002, Publisher: International Engineering Consortium.

Georges et al., "U.S. Appl. No. 08/635,368", "Distribution of Radio-Frequency Signals Through Low Bandwidth Infrastructures", Filed Apr. 19, 1996, Publisher: Abandoned, Published in: US.

Schwartz, "U.S. Appl. No. 09/560,656", "Adaptive Capacity Management in a Centralized Basestation Architecture", Filed Apr. 27, 2000, Publisher: Abandoned, Published in: US.

Wong et al., "U.S. Appl. No. 09/561,372", "A Cellular Communications System With Centralized Capacity Resources Using DWDM Fiber Optic Backbone", Filed Apr. 28, 2000, Publisher: Abandoned, Published in: US.

Eng et al., "U.S. Appl. No. 09/809,756", "Wireless Location Positioning Using a Distributed Antenna Architecture", Filed Mar. 14, 2001, Publisher: Abandoned, Published in: US.

Sabat Jr., "U.S. Appl. No. 10/352,373", "Method and Apparatus for Auxiliary Pilot Signal for Mobile Phone Location", Filed Jan. 27, 2003, Publisher: Abandoned, Published in: US.

Osaka et al., "U.S. Appl. No. 10/754,279", "Method and System for Determining Mobile Unit Location by Aggregation of Tagged Signals From a Distributed Antenna System", Filed Jan. 8, 2004, Publisher: Abandoned, Published in: US.

* cited by examiner

LOCALIZATION OF A MOBILE DEVICE IN DISTRIBUTED ANTENNA COMMUNICATIONS SYSTEM

FIELD OF THE INVENTION

The present invention relates to the field of wireless communications and, more particularly, to localization of mobile devices in a distributed antenna communications system.

BACKGROUND OF THE INVENTION

A conventional distributed antenna system (DAS) provides indoor or outdoor coverage for wireless communications. Transmitted power is divided among several antennas in distributed locations so as to provide a large coverage area using less transmitted power than would be required by a single antenna system. The antennas of a typical DAS are connected to a cellular base station and are used for cellular mobile communications.

It can be desired to locate a mobile device within a DAS, for example, for emergency purposes (e.g., 911 calls). However, because the received signals from the distributed antennas are typically combined in the uplink to the base station receiver, the base station has no ability to determine which of the distributed antennas is closest to the transmitting mobile device.

SUMMARY OF THE INVENTION

The present invention provides a method and apparatus for localization of a mobile device in a distributed antenna communications system. In accordance with an embodiment of the invention, a distributed antenna system includes a plurality of distributed antennas that are communicatively coupled to a hub. A mobile communications device to be located is communicatively coupled to the hub via one or more of the antennas. The method for locating the mobile device comprises: receiving a message at the hub that identifies the mobile device to be located; discriminating among communications signals received from each of the distributed antennas using a channel and a spreading code to identify a signal from the mobile device; and determining which of the antennas is closest to the mobile device to be located by monitoring received signal strength of the identified signal.

In accordance with an alternative embodiment of the method, the method comprises: receiving an indication at the hub that notifies the hub of commencement of locating the mobile device; instructing the mobile device to modulate its output power; identifying a received signal from the mobile device having modulated output power; and identifying a particular antenna unit among the plurality having a highest received power level from the mobile device.

In accordance with an another alternative embodiment of the method, the method comprises: receiving a message at the hub that identifies the mobile device to be located; identifying a received signal from the mobile device in a frequency channel and timeslot of the mobile device; and determining which of the antennas is closest to the mobile device to be located by monitoring received signal strength of the identified signal

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
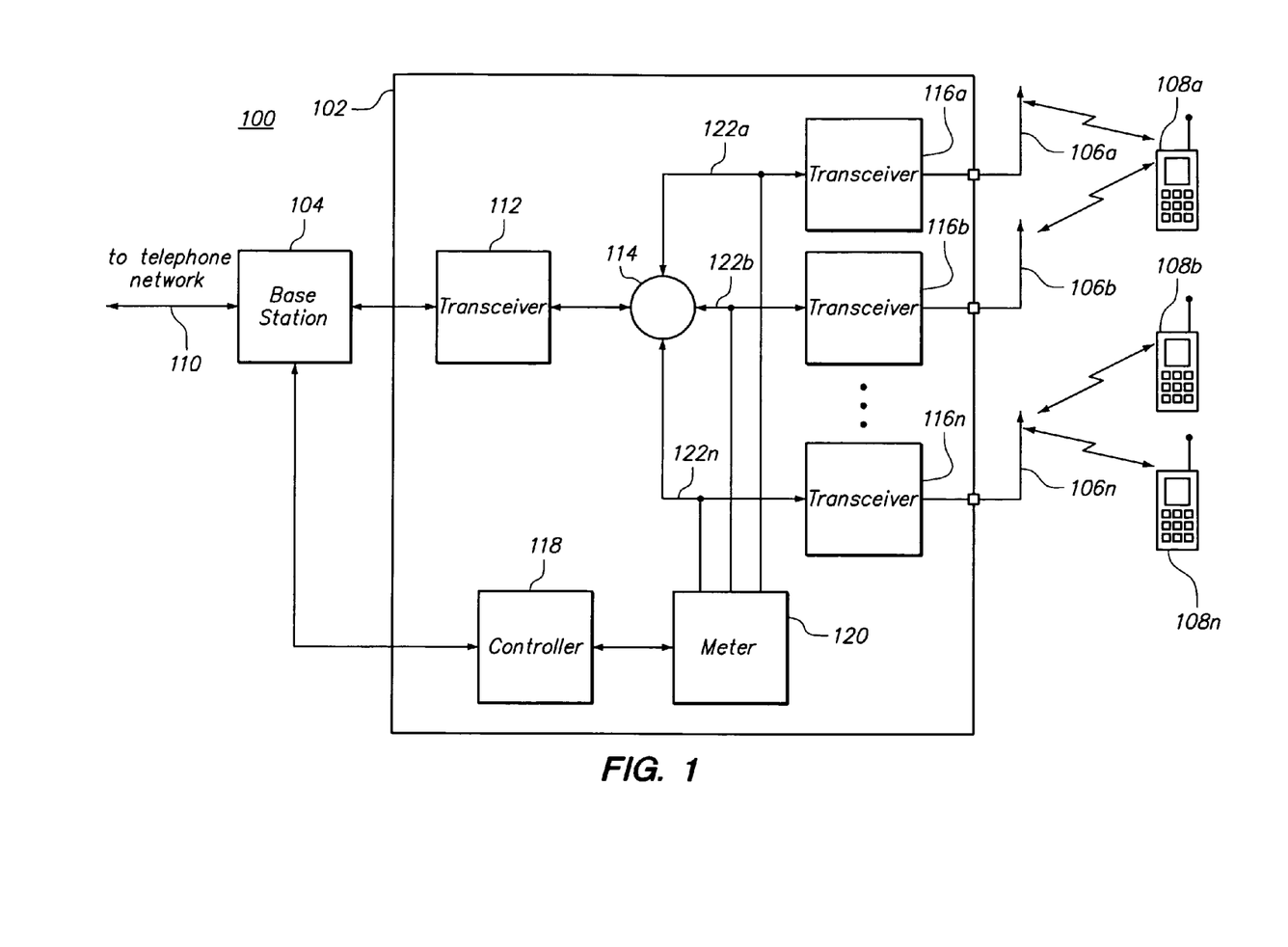
FIG. 1 illustrates a distributed antenna communications system in accordance with an embodiment of the present invention.

FIG. 1 illustrates a distributed antenna communications system 100 in accordance with an embodiment of the present invention. The system 100 includes a communications hub 102, a base station 104, a plurality of distributed antennas 106a-n coupled to ports of the hub 102 and one or more mobile communications devices 108a-n that are communicatively coupled to the hub 102 via the antennas 106a-n. The base station 104 may be located at the site of a cellular service provider and may be coupled to a telephone network via a backhaul 110. The hub 102 may be located at the premises of a telecommunications subscriber with the antennas 106a-n being distributed throughout the premises. For example, the hub 102 may be located within a building (e.g., in a utility room) with the antennas distributed throughout the building so as to provide indoor coverage areas for mobile devices 108a-n. The mobile devices 108a-n may be, for example, cell phones. While three mobile devices 108a-n and three antennas 106a-n are illustrated, it will be apparent that more or fewer of either may be present. In an embodiment, up to eight antennas 106a-n may be coupled to a single hub 102. Additionally, one or more of the antennas 106a-n may be located outdoors.

The system 100 preferably provides for two-way communications. For the downlink, telecommunications signals are received by the base station 104 from the telephone network and distributed to the antennas 106a-n. To accomplish this, a transceiver 112 may receive the downlink signal from the base station 104. The transceiver 112 then amplifies the downlink signal to an appropriate level for forwarding to a distribution node 114. The distribution node 114 then repeats and distributes the signal to a plurality of transceivers 116a-n such that each of the transceivers 116a-n receives a copy of the downlink signal. The transceivers 116a-n each transmits the signal received from the distribution node 114 via a corresponding one of the antennas 106a-n. The mobile devices 108a-n each pick up the downlink signal from one or more of the antennas 106a-n.

For the uplink, signals from the mobile devices 108a-n are received by the transceivers 116a-n via the antennas 106a-n. The signals are then forwarded to the distribution node 114 which combines the signals (e.g., by simple summation) into a combined signal. The combined signal is transmitted to the base station 104 by the transceiver 112. The base station 104 then forwards the combined signal to the telephone network.

In an embodiment, the downlink signal from the base station 104 is RF (Radio Frequency). For example, this signal is communicated via a cable or via a wireless link between the transceiver 112 and the base station 104. In this case, the transceiver 112 may down-convert the downlink signal from RF to IF. This signal is then distributed to the transceivers 116a-n in IF. The transceivers 116a-n up-convert the IF signal to RF (Radio Frequency) before transmitting the signal to the mobile devices 108a-n. For the uplink, the transceivers 116a-n down-convert RF signals received from the mobile devices 108a-n to IF. These IF signals are then processed and combined for delivery to the transceiver 112 in IF. The transceiver 112 then up-converts the IF signal to RF for delivery the base station 104

So that multiple mobile devices 108a-n may communicate via the system 100 simultaneously, each communicates in a different channel. For example, CDMA (Code-Division, Multiple Access) protocols for cellular communication, such as UMTS (Universal Mobile Telecommunications System), or TDMA (Time-Division, Multiple-Access) protocols for cellular communication, such as GSM (Global System for Mobile Communications) may be employed by the system 100. Thus, for the downlink, the same signal including the various channels is transmitted via each of the antennas 106a-n so that it may be received by any of the mobile devices 108a-n without regard to which of the antennas 106a-n is closest to a particular one of the mobile devices. For the up-link, the signal from a particular mobile device may be picked up by one or more antennas 106a-n. As shown in FIG. 1, the signal from device 108a is picked up by antennas 106a and 106b, though the signal may be stronger at one of the antennas than the other. As is also shown in FIG. 1, the signal from device 108b is picked up only by antenna 106n. The signal from device 108n is also picked up only by the antenna 106n. All of the signals picked up by any of the antennas 106-n are combined at node 114 and included in the combined signal received at the base station 104.

Because the signals from the mobile devices 108a-n are combined, the base station 104 is not able to determine which of the antennas 106a-n is picking up the signal from a particular mobile device and, thus, the base station 104 cannot determine the location of that mobile device. It may be desired, however, to locate a particular mobile device within the system 100, for example, for emergency purposes (e.g., 911 calls).

Figure 2:
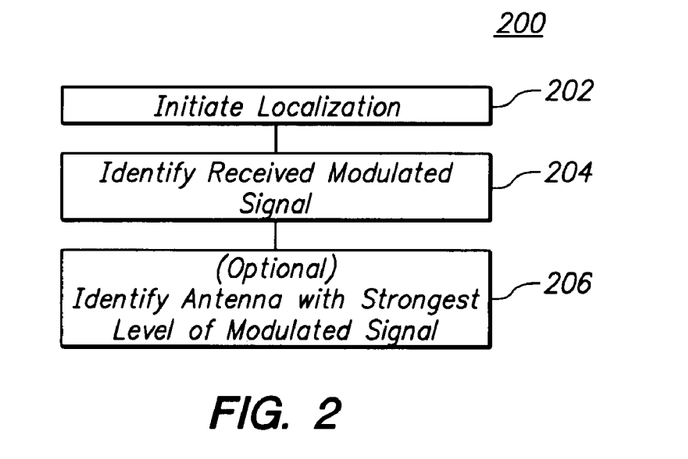
FIG. 2 illustrates a method of locating a mobile device in a distributed antenna communications system in accordance with an embodiment of the present invention.

FIG. 2 illustrates a method 200 of locating a mobile device in a distributed antenna communications system in accordance with an embodiment of the present invention. The method 200 may be employed within the system 100 of FIG. 1. In a step 202, localization is initiated. For example, the base station 104 may receive an emergency 911 call from one of the mobile units 108a or 108b. The base station 104 may then initiate localization of the calling mobile unit so as to assist emergency personnel to locate the caller. This may be accomplished by the base station 104 sending a message to the hub 102 which instructs elements of the hub 102 that localization is being initiated. The message sent to the hub 102 may also identify the mobile device to be localized, though this is not always necessary. If the mobile device is identified by the message, the message may identify the mobile device by the frequency channel (e.g. for UMTS) it is operating in or by its frequency channel and timeslot (e.g. for GSM). As shown in FIG. 1, a hub controller 118 may receive this message from the base station 104.

In addition, in step 202, the mobile device being localized is instructed to modulate its output power so that its output power changes over time. For example, the base station 104 may send a message to the particular device instructing it to adjust its output power to first level (e.g., 10 mW). Then, the base station 104 may send another message instructing the device to adjust its output power to a second level (e.g., 50 mW). The base station 104 may send a series of such messages to the particular mobile device being localized so that the level of its output power follows an identifiable pattern.

Figure 3:
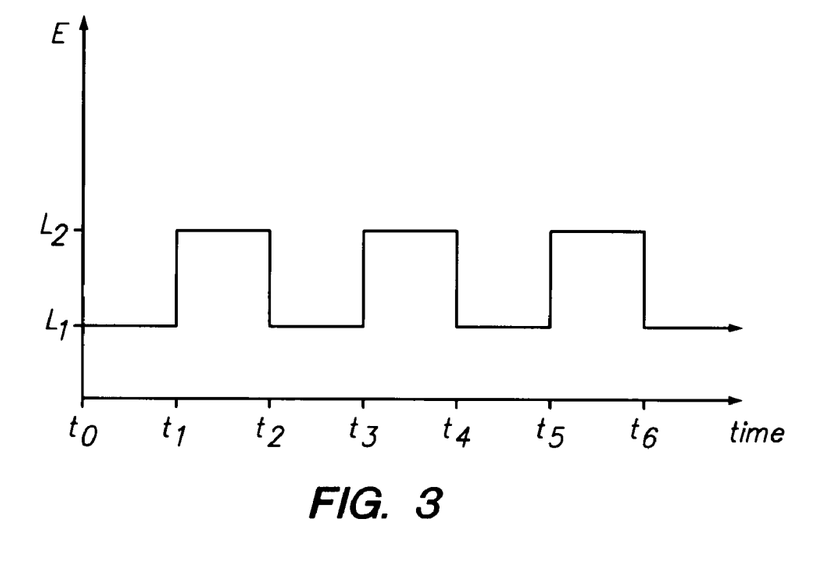
FIG. 3 illustrates a timing diagram showing modulated output power of a mobile device being located in accordance with an embodiment of the present invention.

FIG. 3 illustrates a timing diagram showing modulated output power of a mobile device being located in accordance with an embodiment of the present invention. As shown in FIG. 3, the mobile device adjusts its output power to a first level $L_1$ at a time $t_0$ in response to a received instruction. Then, the mobile device adjusts its output power to a second level $L_2$ at a time $t_1$ in response to another received instruction. Later, the mobile device adjusts it output power to the first level $L_1$ at time $t_2$ in response to yet another received instruction. In this manner, the output power level of the mobile device follows an identifiable pattern. While FIG. 3 shows the level oscillating between two levels at uniform time intervals, this is not necessary. All that is needed for the output power to follow a pattern which is distinct from that of any other mobile device communicating within the system 100.

Returning to FIG. 2, in a step 204, one or more of the antennas 106a-n that receives the modulated signal are identified. This may be accomplished by the hub 102 measuring the strength of the different signals received from each of the distributed antennas 106a-n. As shown in FIG. 1, a signal strength meter 120 is coupled to lines 122a-n from each of the transceivers 116a-n. The signal strength meter may simultaneously monitor all of the lines 122a-n or it may cycle through the lines 122a-n, measuring signal strength on the lines one-at-a-time. Further, the signal strength meter 120 may be tuned to the appropriate channel identified by the base station 104 for the mobile device to be located. In addition, for TDMS protocols, measurement intervals may optionally be timed to coincide with the timeslot being used by the mobile device. To accomplish this, the base station 104 may provide framing reference information to the controller 118. Alternatively, the signal strength meter can measure the combined strength of a frequency range that includes several channels without regard to timeslot.

In response to the initiation message sent in step 202, the controller 118 may then monitor the strength of the signals measured by the meter 120 and identify which signal or signals received from the distributed antennas 106a-n contains the distinct power modulation pattern. If only one of the signals contains the pattern, this indicates that the mobile device sending the pattern is located in the vicinity of the one of the antennas 106a-n that received that particular signal. Because the location of each of the antennas 106a-n is known, the location of the mobile device is determined from this information.

If more than one of the signals received from the distributed antennas 106a-n contain the distinct power modulation pattern, the controller 118 may further determine which of the distributed antennas 106a-n receives the highest level of the distinct modulation pattern in step 206. This indicates that the mobile device sending the pattern is located closest to the one of the antennas that received the strongest level of the particular signal. Because the location of each of the antennas 106a-n is known, the location of the mobile device is determined from this information. Step 206 need not be performed if only one antenna receives a signal from the mobile device whose location is to be determined.

The method described above can be used to determine the location of a mobile device using CDMA or TDMA protocols and does not require the hub 102 to have knowledge of the particular frequency channel or timeslot of the mobile device. In an alternative embodiment applicable to TDMA protocols, such as GSM, the mobile device need not modulate its output power to be localized. Rather, the frequency channel and timeslot being used by the mobile device can be used to uniquely identify the signal from the mobile device. This is because it can be expected that no other device will be operating in the same channel and timeslot at the same time. To determine which of the antennas 106a-n is closest to the mobile device, the signal strength from each of the antennas 106a-n is measured at the frequency and the timeslot of the mobile device and compared to determine which is strongest and, therefore, closest to the mobile device. More particularly, in a first step, localization is initiated by the base station 104 sending a message to the hub 102 which identifies the mobile device to be localized. The message may identify the mobile device by its frequency channel and timeslot. In a second step, the strength of the signal received from each of the distributed antennas 106a-n is measured for the frequency channel and timeslot of the mobile device being located. This may be accomplished by tuning the signal strength meter 120 to the frequency channel being used by the mobile device and by the controller 118 timing measurement intervals so that they coincide with the timeslot being used by that mobile device (using framing reference information received from the base station 104). As before, the signal strength meter 120 may simultaneously monitor all of the lines 122a-n or it may cycle through the lines 122a-n, measuring signal strength on the lines one-at-a-time. If a signal is detected in the frequency channel and timeslot from only one of the antennas 106a-n, this indicates that the mobile device is located in the vicinity of that one of the antennas. Because the location of each of the antennas 106a-n is known, the location of the mobile device is determined from this information. If more than one of the distributed antennas 106a-n picks up the signal in the frequency channel and timeslot of the mobile device being located, the controller 118 may further determine which of the distributed antennas 106a-n receives the highest level in that frequency channel and timeslot. This indicates that the mobile device is located closest to the one of the antennas that received the strongest level in the frequency channel and timeslot.

Figure 4:
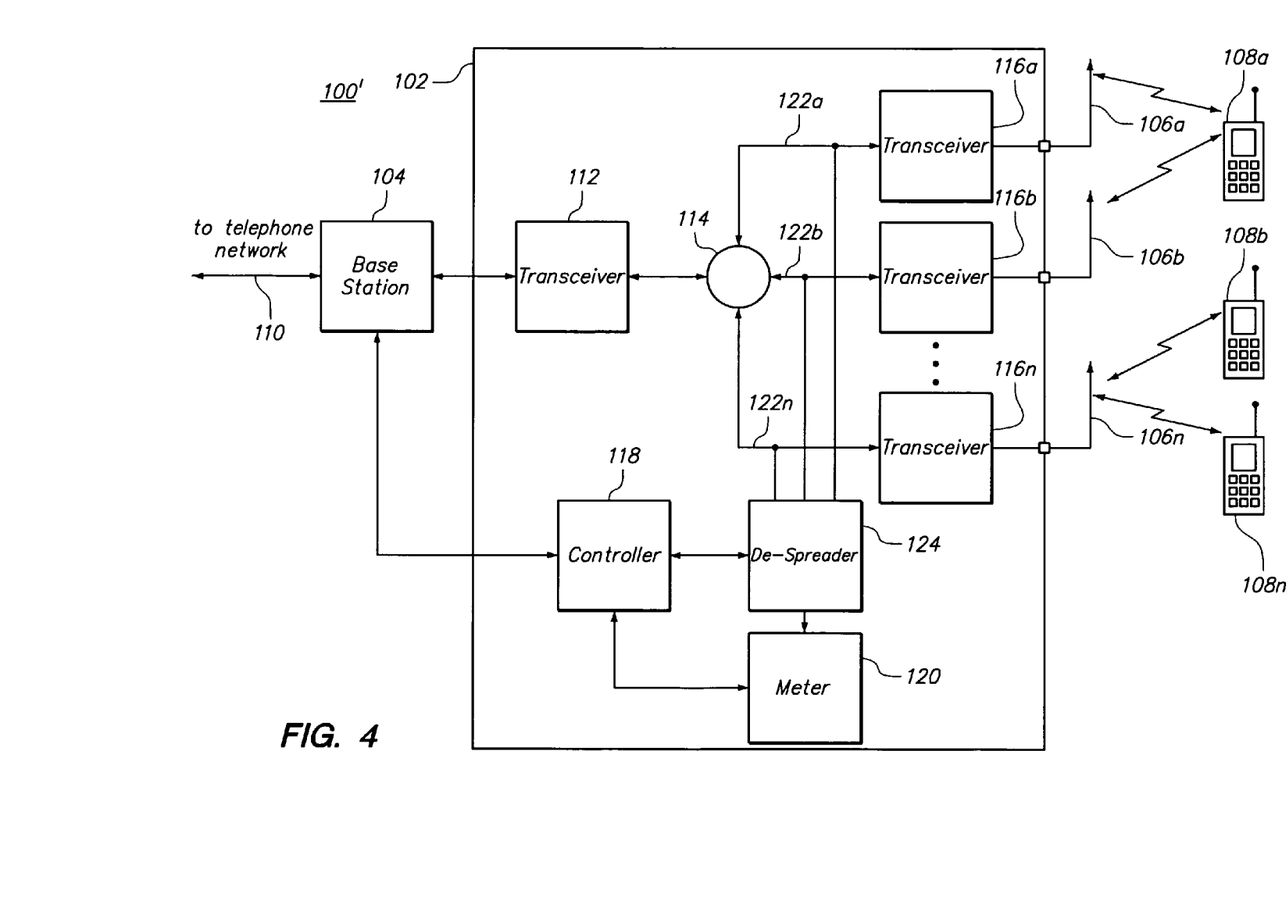
FIG. 4 illustrates a distributed antenna communications system in accordance with an alternative embodiment of the present invention.

FIG. 4 illustrates a distributed antenna communications system 100' in accordance with an alternative embodiment of the present invention. This embodiment is applicable to CDMA protocols, such as UMTS that use spread spectrum channel modulation schemes. The system 100' of FIG. 4 may be identical to the system 100 of FIG. 1 with differences described below. Accordingly, like reference numerals are used for corresponding elements of FIGS. 1 and 4. The system 100' differs from the system 100 of FIG. 1 in that a de-spreader 124 is provided. The de-spreader 124 uses spreading codes to discriminate among channels included in the signals received from the mobile devices 108a-n on lines 122a-n (via the antennas 106a-n and transceivers 116a-n). This may be accomplished by the de-spreader converting the IF signals to baseband and by applying a spreading code. Thus, by using the spreading code of the mobile device to be located, the de-spreader removes components of the received signal that are contributed by other mobile devices operating within the system 100'. The meter 120 and controller 118 monitor the levels corresponding to the identified channel and compares those levels for each of the antennas 106a-n to determine which of the antennas 106a-n is closest to the mobile device being located.

Figure 5:
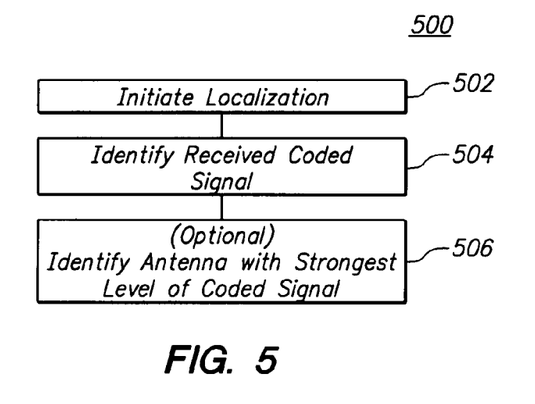
FIG. 5 illustrates an alternative method of locating a mobile device in a distributed antenna communications system in accordance with an embodiment of the present invention.

FIG. 5 illustrates a method 500 of locating a mobile device in a distributed antenna communications system in accordance with an embodiment of the present invention. The method 500 may be employed within the system 100' of FIG. 4. In a step 502, localization is initiated. For example, the base station 104 may receive an emergency 911 call from one of the mobile units 108a or 108b. The base station 104 may then initiate localization of the calling mobile unit so as to assist emergency personnel to locate the caller. This may be accomplished by the base station 104 sending a message to the hub 102 which identifies the mobile device to be localized. The message may, for example, identify the mobile device by its frequency channel and unique transmission spreading code. The hub controller 118 may receive this message from the base station 104.

In a step 504, one or more signals received by the hub 102 from the mobile devices 108a-n are identified as originating from the mobile device whose location is to be determined. This may be accomplished by the de-spreader 124 using the spreading code to discriminate the signal from the mobile device being located from the other signals received from the transceivers 116a-n of the hub 102. The signal strength meter 120 measures the level of the discriminated signal from each of the antennas 106a-n. If the discriminated signal is picked up by only one of the antennas, this indicates that the mobile device is located in the vicinity of the one of the antennas 106a-n that picked up the signal. Because the location of each of the antennas 106a-n is known, the location of the mobile device is determined from this information.

If more than one of the distributed antennas 106a-n picked up the discriminated signal from the mobile device, the controller 118 may further determine which of the distributed antennas 106a-n receives the highest level of the signal in step 506. To accomplish this, the signal strength meter 120 and controller 118 may monitor and compare the signal levels received from the antennas that are picking up the signal to determine which has the highest level. Because the location of each of the antennas 106a-n is known, the location of the mobile device is determined from this information. Step 506 need not be performed if only one antenna receives a signal from the mobile device whose location is to be determined.

Once the particular mobile device is located using any of the localization methods described herein, additional steps may be taken to send a notification of the location to personnel for facilitating locating the mobile device and, thus, the caller. For example, an e-mail may be automatically generated by the controller 118 and sent to an emergency call processing center via the base station 104 and a wide area computer network (e.g. the Internet) so that emergency personnel can be informed of the caller's location. As another example, a message or signal may be sent by the controller 118 to circuitry associated with the nearest antenna which then activates an optical and/or acoustical signal which can be perceived by emergency personnel or which sends a message which can be perceived by equipment carried by emergency personnel.

Figure 6:
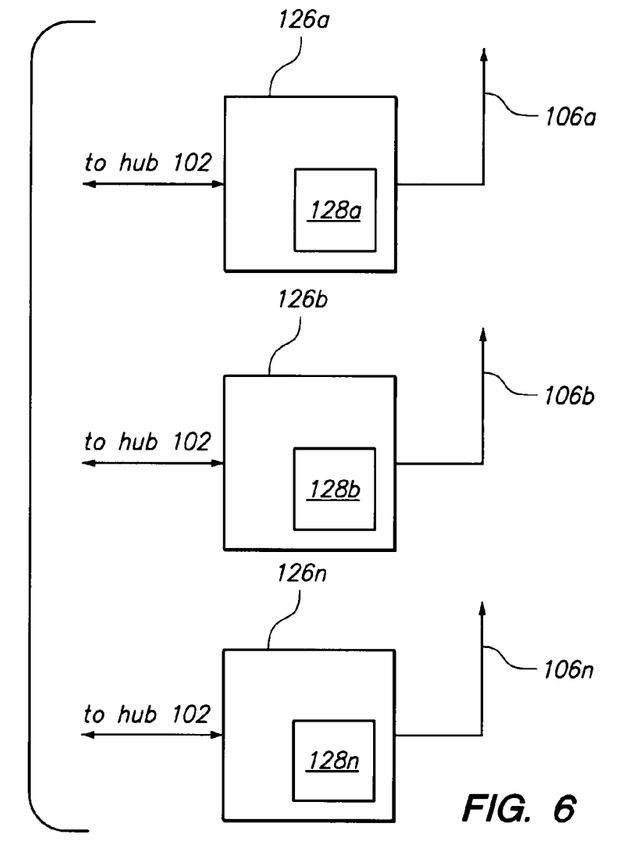
FIG. 6 illustrates distributed antenna units having location transmitters in accordance with an embodiment of the present invention.

FIG. 6 illustrates an embodiment in which each distributed antenna 106a-n is associated with an antenna unit 126a-n having a location emitter 128a-n. Once the antenna closest to the mobile device being located is identified by the controller 118 (FIGS. 1 and 4), the controller 118 may send a signal to the antenna unit 126a-n associated with that particular antenna 106a-n, instructing activation of its location emitter 128a-n. The activation signal may be sent via a wired connection (e.g. via the antenna unit's connection to the hub) or via a wireless connection (e.g. sent directly to the antenna unit).

The particular location emitter 128a-n which is determined to be closest to the mobile device being located may then emit a human perceptible signal, such as an optical signal (e.g. a flashing light), or an audible signal (e.g. a beeping sound). This emitted signal may then be used to facilitate personnel in locating that particular antenna unit and, thus, the particular mobile device and caller. Alternatively, the particular location emitter 128a-n may send short range wireless message to equipment carried by personnel attempting to locate the caller. For example, the location emitters 128a-n may operate in accordance with a wireless personal area network (PAN) protocol such as Bluetooth or ZigBee. This message may include location information which facilitates personnel in locating the particular antenna unit and, thus, the particular mobile device and caller. For example, the location information may be in the form of a text message, such as "Go up the stairs to the second floor and proceed down the hallway to the right" or "The caller is located in the southeastern wing of the building."

Figure 7:
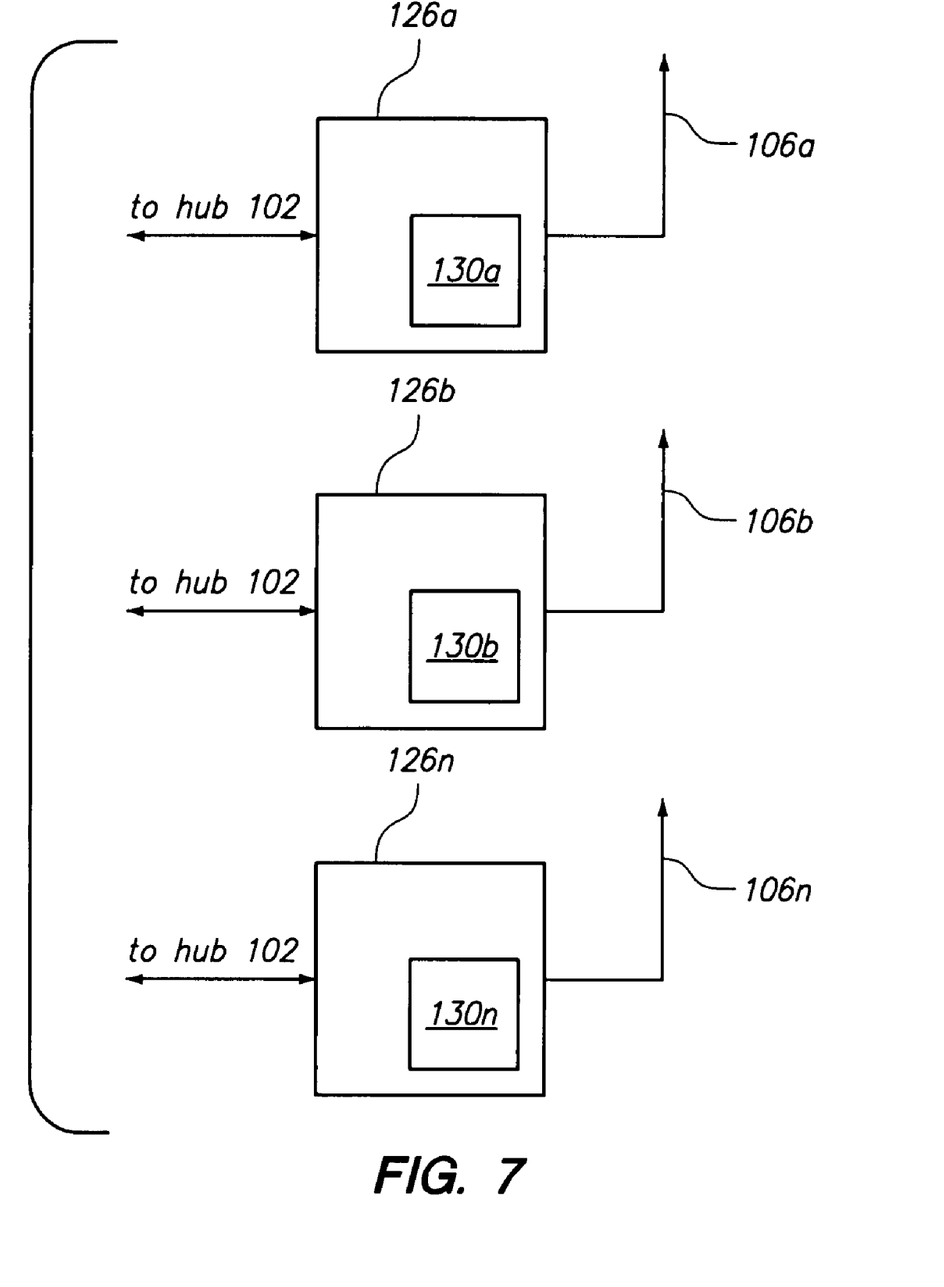
FIG. 7 illustrates distributed antenna units having signal strength measurement capability in accordance with an embodiment of the present invention.

In the embodiments described above, signal strength information is obtained by measuring the signals at the hub 102. In an alternative embodiment, the signal strength measurements may be performed at the antennas. FIG. 7 illustrates distributed antenna units having signal strength measurement capability in accordance with an embodiment of the present invention. As shown in FIG. 7, each antenna unit 126a-n is equipped with a corresponding signal measurement device 130a-n. Each measurement device 130a-n may include a controller, a signal strength meter, and, optionally, a de-spreader which operate similarly to the hub controller 118, meter 120 and de-spreader 124 described above in reference to FIGS. 1 and 4. More particularly, messages received by the hub controller 118 from the base station 104 may be forwarded to the controllers of the measurement devices 130a-n. These messages notify the measurement devices 130a-n of initiation of localization of a mobile device and may also identify the mobile device to be located. In response, each measurement device 130a-n takes signal strength measurements (as described herein with respect to the meter 120 of FIGS. 1 and 4) and reports the results to the hub controller 118. In an embodiment, these signal strength measurements may be performed in an identified channel and timeslot using framing information or using a spreading code received from the hub controller 118.

The hub controller 118 then uses the received results to determine whether any of the antennas 106a-n are picking up the signal from the mobile device to be located. If only one antenna 106a-n is picking up the signal, this indicates that the mobile device is located in the vicinity of the one of the antennas 106a-n that picked up the signal. If more than one of the distributed antennas 106a-n picked up the signal from the mobile device, the controller 118 may further determine which of the distributed antennas 106a-n receives the highest level of the signal by comparing the signal levels reported by the corresponding antenna units 126a-n.

Figure 8:
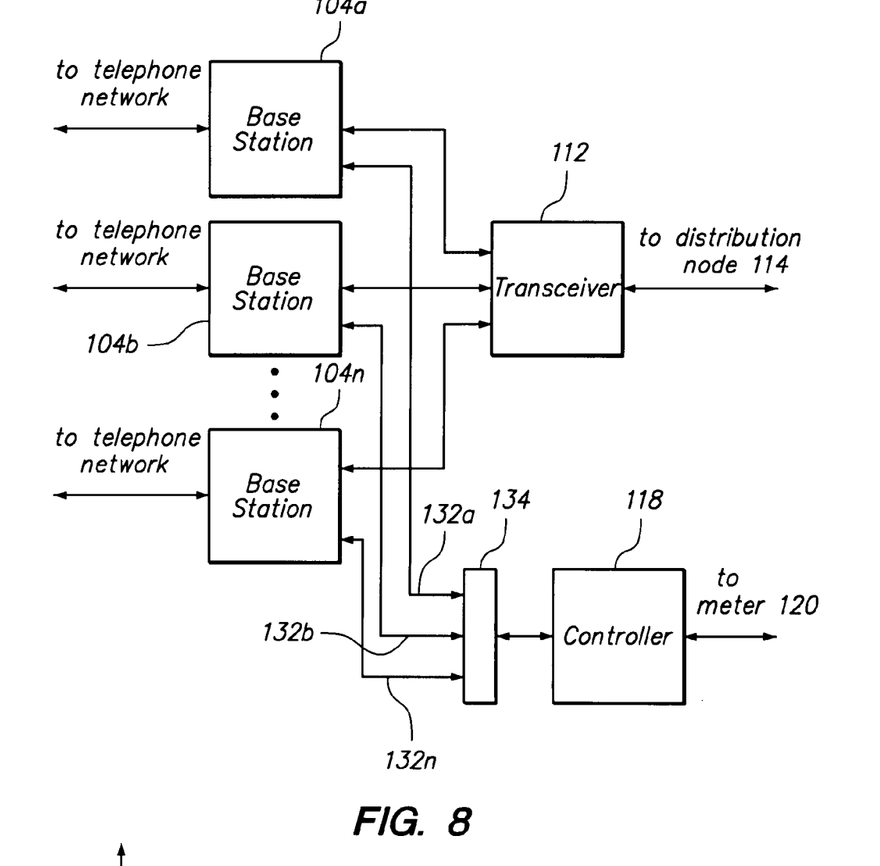
FIG. 8 illustrates a distributed antenna communications system having multiple base stations in accordance with an embodiment of the present invention.

In the embodiments described above, a single base station 104 is coupled to the hub 102. In other embodiments, two or more base stations may be coupled to the hub 102. FIG. 8 illustrates a distributed antenna communications system having multiple base stations 104a-n in accordance with an embodiment of the present invention. As shown in FIG. 8, each of the base stations 104a-n is coupled to the transceiver 112 for uplink and downlink communications with the mobile units 108a-n (FIGS. 1 and 4). In addition, each of the base stations 104a-n is coupled to the controller 118 via a corresponding one of communication links 132a-n and via a register 134. Each of the links 132a-n carries bidirectional serial communications. Thus, each of the links 132a-n may include a first signal line for communication from the corresponding base unit 104a-n to the controller 118 and a second signal line for communication from the controller 118 to the corresponding base station 104a-n.

When any of the base stations 104a-n determines that a mobile device is to be located (e.g. in response to receiving a 911 call), that base station 104a-n raises its signal line to the controller 118. This sets a corresponding indicator bit in the register 134. The set indicator bit indicates to the controller 118 that the corresponding base station is ready to initiate localization of a mobile device. If the controller 118 is not already responding to a set indicator bit from another base station, the controller 118 responds to the base station by raising the corresponding signal line to the base station. Upon receiving this response, the base station instructs the mobile unit being located to modulate its output power. The controller 118 then determines the location of the mobile unit as described herein with reference to FIGS. 1 and 3. Once the mobile device has been located, the controller 118 may clear (i.e. reset) the indicator bit in the register 134. The controller 118 may then respond to any other set indicator bits in the register 134. In this manner, the controller 118 may process multiple requests to locate mobile devices in the order in which they are received.

Figure 9:
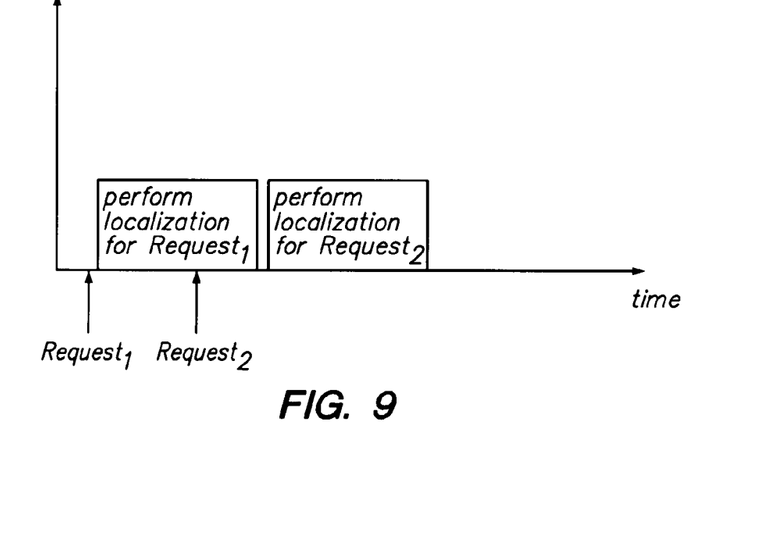
FIG. 9 illustrates a timing diagram for responding to multiple requests to locate mobile devices in accordance with an embodiment of the present invention.

FIG. 9 illustrates a timing diagram for responding to multiple requests to locate mobile devices in accordance with an embodiment of the present invention. As shown in FIG. 9, after a first request ($Request_1$) is received by the controller 118 and no other request is currently pending, the first request is processed by localizing the mobile device corresponding to the first request. Then, while the first request is still being processed, a second request ($Request_2$) is received. Localizing of the mobile device corresponding to the second request is commenced after the localizing of the mobile device corresponding to the first request is completed.

Figure 10:
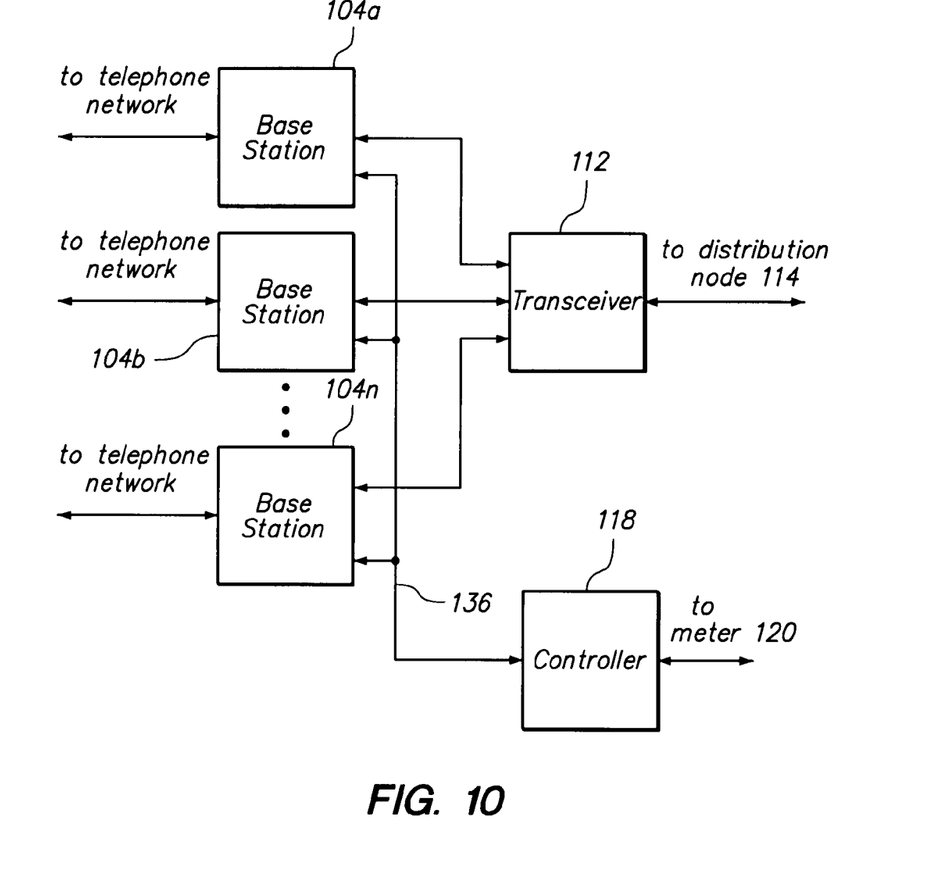
FIG. 10 illustrates a distributed antenna communications system having multiple base stations in accordance with an alternative embodiment of the present invention.

FIG. 10 illustrates a distributed antenna communications system having multiple base stations in accordance with an alternative embodiment of the present invention. As shown in FIG. 10, each of the plurality of base stations 104a-n is coupled to the transceiver 112 for uplink and downlink communications with the mobile units 108a-n (FIGS. 1 and 4). In addition, each of the base stations 104a-n is coupled to the controller 118 via a shared communication bus 136. Thus, each of the base stations 104a-n may communicate with the controller 118 via the bus 136.

When any of the base stations 104a-n determines that a mobile device is to be located (e.g. in response to receiving a 911 call), that base station 104a-n sends a message to the controller 118. The message identifies the originating base station and notifies the controller 118 that the base station is ready to commence localization of a mobile device. The message may also identify the mobile device to be located such as by its frequency channel and timeslot or spreading code. If the controller 118 is not already responding to such a request message from another base station (or to a prior request from the same base station), the controller 118 responds to the base station with a response message which notifies the base station that its request is ready to be processed. Upon receiving this response, the base station may instruct the mobile unit being located to modulate its output power (as described above with reference to FIGS. 1 and 3). Alternatively, the controller 118 may localize the mobile device by performing signal strength measurements for the identified frequency channel, frequency channel and timeslot or by using an appropriate spreading code (as described herein).

Once the mobile device has been located, the controller 118 may then respond to any other request messages. In this manner, the controller 118 may process multiple requests to locate mobile devices in the order in which they are received. While the embodiments of FIGS. 8 and 10 show three base stations 104*a-n*, it will be apparent that the system may be implemented with one, two or more than three base stations.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method for locating a mobile communications device in a distributed antenna system in which plural distributed antennas are communicatively coupled to a hub and in which the mobile device is communicatively coupled to the hub via one or more of the antennas, the method comprising:
    receiving at the hub communication signals from the plural distributed antennas;
    combining the received communication signals to produce a combined signal;
    forwarding the combined signal to a base station, wherein the mobile device is communicatively coupled to the base station via the hub;
    receiving a message at the hub that identifies the mobile device to be located;
    discriminating, at the hub, among communications signals received from each of the distributed antennas using a channel and a spreading code to identify a signal from the mobile device; and
    determining which of the antennas is closest to the mobile device to be located by monitoring received signal strength of the identified signal.

2. The method according to claim 1, wherein the mobile device communicates using a CDMA protocol for cellular communications.

3. The method according to claim 1, wherein the message identifies the mobile device according to its channel and the spreading code.

4. The method according to claim 1, further comprising sending a notification of the location of the antenna determined to be closest to the mobile device for facilitating locating the mobile device.

5. The method according to claim 1, wherein a notification is sent from an emitter associated with the antenna determined to be closest via a wireless personal area network.

6. The method according to claim 1, wherein a notification is sent from an emitter associated with the antenna determined to be closest in the form of a human perceptible signal.

7. The method according to claim 1, wherein the notification is sent via a wide area network.

8. The method according to claim 1, wherein the monitoring of received signal strength of the identified signal is performed at the hub.

9. The method according to claim 1, wherein the monitoring of received signal strength of the identified signal is performed at the antennas.

10. The method according to claim 1, wherein a plurality of base stations are coupled to the hub and further comprising queuing the message at the hub until a prior request to locate a mobile device has been processed.

11. A distributed antenna system comprising:
    a base station configured for communication with a telecommunications network;
    a multi-port hub connected to the base station that receives communication signals on a plurality of ports of the multi-port hub from a plurality of distributed antennas and combines the received communication signals for forwarding a combined signal to the base station, wherein the multi-port hub comprises:
    a de-spreader that uses a spreading code to identify a signal from a mobile communications device to be located; and
    a controller that determines which of the antennas is closest to the mobile device to be located by monitoring received signal strength of the identified signal.

12. A method for locating a mobile device in a distributed antenna system in which plural distributed antennas are communicatively coupled to a hub and in which the mobile device is communicatively coupled to the hub via one or more of the antennas, the method comprising:
    receiving at the hub communication signals from the plural distributed antennas;
    combining at the hub the received communication signals to produce a combined signal;
    forwarding the combined signal from the hub to a base station, wherein the mobile device is communicatively coupled to the base station via the hub;
    receiving an indication at the hub that notifies the hub of commencement of locating the mobile device;
    instructing the mobile device to modulate its output power;
    identifying, at the hub, a received signal from the mobile device having modulated output power; and
    identifying a particular antenna unit among the plurality having a highest received power level for the received signal from the mobile device having modulated output power.

13. The method according to claim 12, wherein the mobile device communicates using a CDMA protocol for cellular communications.

14. The method according to claim 12, wherein the indication is a message that identifies the mobile device according to its frequency channel or according to its frequency channel and timeslot.

15. The method according to claim 12, wherein the mobile device communicates using a TDMA protocol for cellular communications.

16. The method according to claim 12, further comprising sending a notification of the location of the antenna determined to be closest to the mobile device for facilitating locating the mobile device.

17. The method according to claim 12, wherein a notification is sent from an emitter associated with the antenna determined to be closest via a wireless personal area network.

18. The method according to claim 12, wherein a notification is sent from an emitter associated with the antenna determined to be closest in the form of a human perceptible signal.

19. The method according to claim 12, wherein the notification is sent via a wide area network.

20. The method according to claim 12, wherein the identifying the received signal from the mobile device having modulated output power is performed at the hub.

21. The method according to claim 12, wherein the identifying the received signal from the mobile device having modulated output power is performed at the antennas.

22. The method according to claim 12, wherein a plurality of base stations are coupled to the hub and wherein the indication is set in a register until a prior request to locate a mobile device has been processed.

23. A distributed antenna system comprising:
a base station configured for communication with a telecommunications network; and
a multi-port hub connected to the base station that receives communication signals on a plurality of ports of the multi-port hub from a plurality of distributed antennas and combines the received communication signals for forwarding a combined signal to the base station, wherein the multi-port hub determines which of the antennas is closest to a mobile device to be located by the base station by instructing the mobile device to modulate its output power, the hub identifying a received signal from the mobile device by its modulated output power, and identifying a particular antenna unit among the plurality having a highest received power level for received signal from the mobile device by its modulated output power.

24. A method for locating a mobile communications device in a distributed antenna system in which plural distributed antennas are communicatively coupled to a hub and in which the mobile device is communicatively coupled to the hub via one or more of the antennas, the method comprising:
receiving at the hub communication signals from the plural distributed antennas;
combining at the hub the received communication signals to produce a combined signal;
forwarding the combined signal from the hub to a base station, wherein the mobile device is communicatively coupled to the base station via the hub;
receiving a message at the hub that identifies the mobile device to be located;
identifying, at the hub, a received signal from the mobile device in a frequency channel and timeslot of the mobile device; and
determining which of the antennas is closest to the mobile device to be located by monitoring received signal strength of the identified signal.

25. The method according to claim 24, wherein the mobile device communicates using a TDMA protocol for cellular communications.

26. The method according to claim 24, wherein the message identifies the mobile device according to its frequency channel and timeslot.

27. The method according to claim 24, further comprising sending a notification of the location of the antenna determined to be closest to the mobile device for facilitating locating the mobile device.

28. The method according to claim 24, wherein a notification is sent from an emitter associated with the antenna determined to be closest via a wireless personal area network.

29. The method according to claim 24, wherein a notification is sent from an emitter associated with the antenna determined to be closest in the form of a human perceptible signal.

30. The method according to claim 24, wherein the notification is sent via a wide area network.

31. The method according to claim 24, wherein the monitoring of received signal strength of the identified signal is performed at the hub.

32. The method according to claim 24, wherein the monitoring of received signal strength of the identified signal is performed at the antennas.

33. The method according to claim 24, wherein a plurality of base stations are coupled to the hub and further comprising queuing the message at the hub until a prior request to locate a mobile device has been processed.

34. A distributed antenna system comprising:
a base station configured for communication with a telecommunications network; and
a multi-port hub connected to the base station that receives communication signals on a plurality of ports of the multi-port hub from a plurality of distributed antennas and combines the received communication signals for forwarding a combined signal to the base station, wherein the multi-port hub determines which of the antennas is closest to a mobile device to be located by identifying a received signal from the mobile device by its frequency channel and timeslot, and identifying a particular antenna unit among the plurality having a highest received power level for the received signal from the mobile device.

* * * * *